March 23, 1937.　　H. S. OGDEN　　2,074,853
CONTROL SYSTEM
Filed May 14, 1935
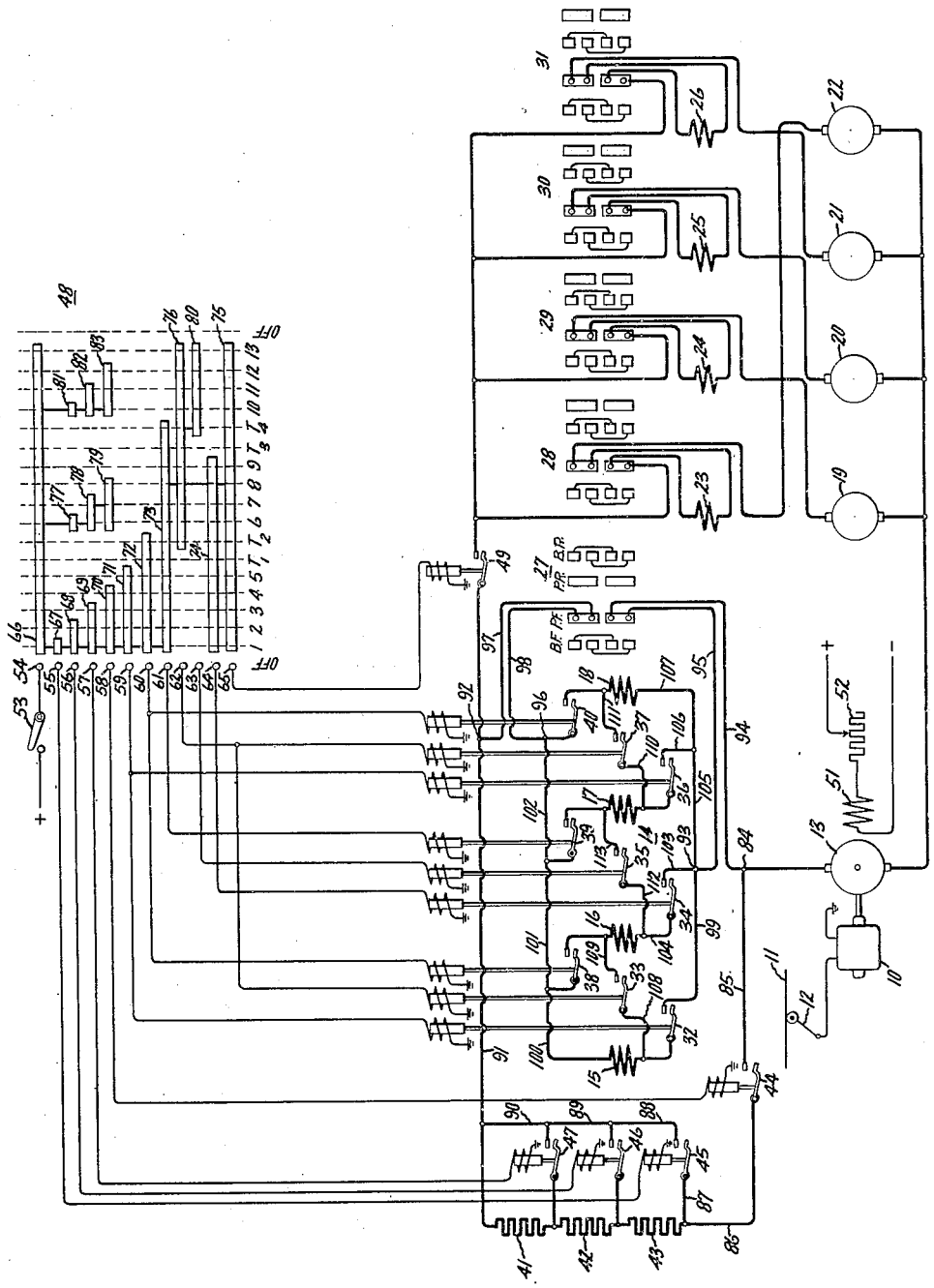
Inventor:
Harold S. Ogden,
by Harry E. Dunham
His Attorney.

Patented Mar. 23, 1937

2,074,853

UNITED STATES PATENT OFFICE 2,074,853

CONTROL SYSTEM

Harold S. Ogden, Erie, Pa., assignor to General Electric Company, a corporation of New York Application May 14, 1935, Serial No. 21,317

8 Claims. (Cl. 172—239)

My invention relates to control systems for electric vehicles, more particularly to control systems for electric vehicles of the motor-generator type, and has for an object the provision of a simple and reliable system of this character.

Previously known motor-generator type electric vehicles have been provided with either separately excited or shunt excited generators for supplying energy to the traction motors, and with auxiliary apparatus for exciting the motor fields during regenerative braking operation. While these motor-generator type vehicle have proven extremely flexible and well adapted for heavy duty operation, considerable objection has been found due to the cost and the excessive space requirements of the auxiliary exciting apparatus and the control means therefor. Also the load characteristic of a shunt excited or a separately excited generator is such that when a heavy grade is encountered, the voltage of the generator will decrease and an excessive drop in speed will result unless the controller is operated to increase the generator excitation. The use of a compound-wound generator to overcome this objectionable speed regulation has not been found entirely satisfactory because of the high cost of this type of generator. Much is yet to be desired therefore in a simple and reliable control system for a motor-generator type electric vehicle which is inexpensive to construct. Accordingly, it is a further object of my invention to provide a control system for an electric vehicle of the motor-generator type which will provide a constant vehicle speed for each setting of the controller regardless of the grade and curve conditions encountered, and which is adapted for regenerative braking without recourse to auxiliary exciters or balancing resistors.

In carrying out my invention in one form, I provide in connection with an electric vehicle a motor-generator set having a series-wound-generator, the armature and the field windings of which are connected in closed series circuit relation with one or more series-wound traction motors. Means are provided for selectively connecting the generator field and the traction motor fields for motoring operation or for regenerative braking operation, and means are also provided for varying the effective ampere turns of the generator series field to control the speed of the vehicle during motoring operation and to control the braking force exerted during regenerative braking operation. More specifically, the generator field winding comprises a plurality of sections provided with a shunting resistor, and the control means for varying the ampere turns of the generator field is arranged selectively to connect sections of the resistor in parallel circuit relation with the field windings and selectively to vary the connections of the field winding sections relative to each other while maintaining all of the field winding sections in series circuit relation with the armature.

For a more complete understanding of my invention, reference should now be had to the drawing, the single figure of which is a diagrammatic illustration of a control system embodying my invention.

Referring now to the drawing, I have shown my invention in one form as applied to an electric vehicle (not shown) provided with a motor-generator set comprising an alternating-current motor 10 arranged to be energized from a suitable source of alternating current 11 through a trolley 12. It will of course be understood that vehicles embodying my invention may be provided with a suitable direct-current motor in place of or in addition to the alternating-current motor 10, in order to adapt the vehicle to operation on a railway system having a direct current source of supply.

The motor-generator set also comprises a series wound direct-current generator 13 having a multi-section series-connected field winding 14. For purposes of illustration, the generator 13 is shown as comprising a four-pole generator in which the field winding 14 is divided into four pole sections 15, 16, 17 and 18, although it will of course be apparent that a generator having any suitable number of poles may be provided. Connected in series circuit relation with the generator 13, I provide a plurality of direct-current traction motors 19, 20, 21 and 22 respectively provided with series-connected field windings 23, 24, 25 and 26. As shown, the field windings of the traction motors 19 to 22 inclusive are cross-connected in order to balance the currents generated by the motors during regenerative braking operation, that is, each of the field windings 23 to 26 inclusive is respectively connected in series circuit relation with the armature of the next adjacent motor. It will of course be apparent, however, that the field winding of each motor may be normally connected in series circuit relation with its associated armature, and switching means may be provided for cross-connecting the motor fields only during regenerative braking.

In order to provide for power or motoring operation as well as for regenerative braking operation in both a forward and reverse direction, a plurality of reversing switches 27 to 31 inclusive are provided. As shown, the reversing switch 27 is arranged to control the field connections of the generator 13, and the reversing switches 28 to 31 inclusive are respectively arranged to control the field connections of the motors 19 to 22 inclusive. The reversing switches are preferably of the drum controller type as shown, and for convenience of operation may be arranged one above the other and connected to a common operating shaft so as to be operated simultaneously by a single controller handle. In the drawing, I have indicated by suitable legends on the reversing switch 27 the four control positions of the reversing switches, the legends BF and PF indicating respectively the switch positions corresponding to braking operation and power operation in a forward direction, and the legends BR and PR indicating respectively the switch positions corresponding to braking operation and power operation in a reverse direction.

The speed of the vehicle during motoring operation as well as the braking force exerted during regenerative braking operation, is controlled in a manner to be fully explained hereinafter, by varying the field excitation of the generator 13, and in order to accomplish this field variation, I provide a plurality of switches 32 to 40 inclusive for selectively connecting the field sections 15 to 18 inclusive in parallel, in series parallel, or in series circuit relation with each other while maintaining all of the field sections in series circuit relation with the armature of the generator. In order further to vary the field excitation, a shunting resistor comprising the resistor sections 41, 42 and 43 is provided, and a plurality of switches 44, 45, 46 and 47 are arranged selectively to connect the resistor sections in parallel circuit relation with the generator field windings. Although any suitable means may be provided for operating the switches 32 to 40 inclusive, and 44 to 47 inclusive, in a predetermined sequence, in the embodiment of my invention shown, I provide each switch with an operating winding the energization of which is controlled by a suitable drum controller 48 of the type well known in the art. An additional electromagnetic switch 49 which is also controlled by the drum controller 48 is arranged selectively to close or open the power circuit between the generator and the motors.

As will be more fully described hereinafter, during the transition from motoring operation to braking operation, a condition is set up which tends to demagnetize the residual magnetism of the generator 13 and the motors 19 to 22 inclusive, and accordingly, I provide a small auxiliary field winding 51 for the generator 13 for ensuring that the proper polarity will be maintained at all times in the system. This auxiliary field winding 51 which is commonly known as a tickler field, is not reversible and is energized from a separate source of energy through an adjustable resistor 52.

It is now believed that a complete understanding of the invention may be had from a description of the operation. It will be assumed that the motor 10 has been connected to the source of supply 11 and brought up to speed by suitable starting devices (not shown). The locomotive may now be accelerated in a forward direction by first operating the reversing switches 27 to 31 inclusive to the position shown in the drawing, then closing a suitable control switch 53 which connects the controller 48 to a suitable source of control energy, and then operating the controller to its first position.

In this first position of the controller, the switches 44 to 47 inclusive will be energized through circuits to be traced later, to impress a short circuit on the field windings 15, 16, 17 and 18, which field windings are connected in parallel circuit relation with each other by closure of certain of the switches 32 to 40 inclusive. The generator is now excited solely by the tickler field 51 and begins slowly to build up a voltage. It is necessary that this initial voltage be built up rather slowly because the traction motors which are connected directly across the generator terminals by closure of the switch 49 constitute a short circuit until such time as the motors begin to rotate and build up a counter-electromotive force. When the generator voltage has built up sufficiently to cause the traction motors to begin to rotate, the locomotive may be accelerated by operating the controller 48 which is arranged first to insert the resistor sections 43, 42 and 41 in the shunt circuit around the field windings so as to gradually increase the generator field strength and then to open the switch 44 so as to remove the field shunt entirely.

It will be apparent that the vehicle will now be operated at a speed corresponding to full parallel connection of the generator fields, and further acceleration of the vehicle may be accomplished by further operating the controller through succeeding steps, the controller being arranged now to establish energizing circuits for the various switches so as to connect the field windings 15, 16, 17 and 18 in series parallel relation with each other and to establish a shunt circuit around the field windings which includes the resistor 43. The process of inserting the resistor sections 42 and 41 in the field shunt circuit and removing the shunt circuit entirely is now repeated as the controller is operated and when the controller is in its ninth position, the vehicle will be operating at a speed corresponding to full series parallel excitation of the generator.

Acceleration of the vehicle to its maximum speed may now be accomplished by further operating the controller 48 so as to reestablish the shunt circuit which includes the resistor 43 and connect the field windings 15, 16, 17 and 18 in series circuit relation with each other. The effect of the shunt circuit is then gradually varied again until the final operating condition is reached, in which the vehicle is operating with the unshunted generator fields connected in series circuit relation with each other and with the generator armature so as to supply the traction motors with a maximum voltage.

It will of course be apparent that higher operating speeds may be obtained, if desired, by shunting or tapping the exciting fields of the traction motors. Arrangements for accomplishing this control of the traction motor fields are well known in the art and have been omitted from the drawing in order to simplify the circuits as much as possible.

With the controller 48 in a position corresponding to the operating speed desired, the current flowing through the generator and the traction motors will be of such magnitude as always to maintain the locomotive at that speed regardless of the grade or load conditions. This constant speed for each setting of the controller is automatically accomplished by reason of the generator having a characteristic substantially the same as the characteristics of the traction motors.

Upon the occurrence of an increase in grade, it will be seen that there will be an increase in the current drawn by the traction motors but this increase of current will cause an increase of generator field strength as well as an increase of motor field strength, and accordingly, the generator voltage will be increased sufficiently to counteract the increased counter-electromotive force of the traction motors. There will, however, be a slight dropping off of speed due to the internal resistance drop in both the motor and the generator.

If it is assumed now that the vehicle is operating at the desired speed and starts to go downhill, the current will at once fall to zero due to the complete failure of load on the traction motors, and the motors may start to act as generators to build up a voltage in the opposite direction. This tendency of the motors to generate current in the opposite direction will, however, act to demagnetize all of the fields in the circuit. As the locomotive continues to increase in speed due to coasting, no current will flow and the speed of the vehicle will increase until the operator actuates the controller to establish regenerative braking.

To go into regenerative braking, the controller 48 is first moved to the off position adjacent the first notch of the controller and the control switch 53 is opened. The reverser handle may now be operated to move the reversing switches 27 to 31 inclusive to the extreme left-hand position indicated by the legend BF in the drawing, so as to reverse the field connections of the generator and the traction motors. Since regenerative braking must be commenced with maximum field conditions on the generator, the controller 48 is now moved to the off position adjacent the thirteenth notch and the control switch 53 is closed. As the controller 48 is now notched backwards to initiate regenerative braking, it will be apparent that the switch 49 will be closed to connect the generator 13 and the traction motors in series circuit relation.

Since the generator 13 is being driven at a substantially constant speed by the motor 10, it will attempt to build up a voltage due to the tickler field excitation, but it will be remembered that the generator field is now reversed and accordingly the flow of the current through the generator field will be in a direction to neutralize the tickler field excitation. Sufficient current will flow, however, to remagnetize the traction motor fields and since the armatures of the traction motors are now being driven by the vehicle axles, the traction motors will begin to build up voltage and supply energy to the generator 13. The traction motors will not, however, build up until the controller 48 has been notched back to a position corresponding to the speed at which the vehicle is traveling, in which position of the controller the connections of the generator fields and the resistors 41, 42 and 43 will be such as to overcome the tendency of the generator 13 to build up faster, and to a higher value of voltage than that generated by the traction motors. As soon as the controller 48 has been moved to this position the traction motors will build up sufficiently to supply energy to the generator 13 which will then operate as a motor and drive the alternating current motor 10, so as to return power to the source of energy 11.

It will be apparent now that the braking effort exerted by the regenerating traction motors may be controlled by operating the controller 48 to vary the field connections and therefore the counter-electromotive force of the generator 13. The speed of the vehicle during regeneration will be constant for each setting of the controller handle, since as the vehicle tends to speed up, the voltage generated by the traction motors will increase, causing more current to flow and thus building up the counter-electromotive force of the generator equally.

As the grade down which the vehicle is moving flattens out, the current flowing in the motor and generator circuit will tend to decrease and may eventually become zero unless the controller handle is notched back to continue regeneration. The regenerative braking action may be continued until the lowest running speed of the locomotive is reached, although the regeneration may be discontinued at any time by moving the controller handle to the off position adjacent the thirteenth notch, moving the reversing switches to the PF position, opening control switch 53, and returning the controller handle to the off position adjacent the first notch, after which the vehicle is in condition to begin motoring operation.

The control circuits for accomplishing the above sequence of operation and the power circuits which are established during the operation will now be traced. As shown, the controller 48 is provided with a plurality of contact members 54 to 65 inclusive and with a plurality of cooperating segments 66 to 83 inclusive, all of the segments being electrically connected to the segment 66.

When the controller is operated to its first position, it will be observed that the segments 66 to 75 inclusive engage the associated contact fingers to establish energizing circuits for the operating coils of the switches 45, 46, 47, 44, 32, 36, 38, 40, 39, 34, and 49. These circuits are believed to be obvious from an inspection of the drawing and will not be traced in detail. As pointed out above closure of the switches 44 to 47 inclusive, establishes a short circuit around the field winding 14 which may be traced from the connection point 84 through the conductor 85, the contacts of the switch 44, the conductors 86 and 87, the contacts of the switch 45 and the conductors 88, 89, 90 and 91 to the connection point 92 on the other side of the field winding. It will be observed that the connection point 84 is connected to one terminal 93 of the field winding 14 through the conductors 94 and 95 and a segment of the reversing switch 27, and that the connection point 92 is connected to the other field terminal 96 through the conductors 97 and 98 and another segment of the reversing switch 27. It will be remembered that when the controller is in its first position, the field sections 15, 16, 17 and 18 are connected in parallel circuit relation with each other, the circuit for the winding 15 extending from the terminal 93 through the conductor 99, the switch 32, the winding 15 and the conductors 100, 101 and 102 to the other field terminal 96; the circuit for the field winding 16 extending from the terminal 93 through the conductor 103, the switch 34, the conductor 104, the winding 16, the switch 38 and the conductors 101 and 102 to the other field terminal 96; the circuit for the field winding 17 extending from the terminal 93 through the conductors 105 and 106, the switch 36, the winding 17, the switch 39 and the conductor 102 to the other field terminal 96; and the circuit for the field winding 18 extending from the terminal 93 through the conductors 105 and 107, the winding 18, and the switch 40 to the other terminal 96. It will be obvious from the drawing that the traction motors 19, 20, 21 and 22 are connected in parallel circuit relation with each other, each of the motors being connected in series circuit relation with the generator 13 through the switch 49, and the separate motor circuits will accordingly not be traced.

When the controller 48 is operated to its second position, the segment 67 will be disengaged from the contact finger 55 to deenergize the winding of the switch 45, and it will be apparent that the resistor 43 is thereby inserted in the shunt circuit which extends between the connecting points 84 and 92. When the controller is moved in sequence through its third, fourth and fifth steps, it will be seen that the segments 68, 69 and 70 will be sequentially disengaged from the associated contact fingers 56, 57 and 58, thereby deenergizing the switches 46, 47 and 44, respectively. Deenergization of the switch 46 is effective to insert the resistor 42 in the shunt circuit, deenergization of the switch 47 is effective to insert the resistor 41 in the shunt circuit, and deenergization of the switch 44 is effective to open the shunt circuit so that in the fifth controller position the total load current will flow through the field windings 15, 16, 17 and 18 in parallel.

It is now necessary, in order further to accelerate the locomotive, to transfer the field windings 15, 16, 17 and 18 from parallel to series parallel relation, and this is accomplished by means of the transition points $T_1$ and $T_2$ through which the controller passes as it is moved from its fifth position to its sixth position. As the controller moves through the transition point $T_1$, the segment 71 is disengaged from the contact finger 59 and accordingly, the switches 32 and 36 are deenergized, thereby opening the circuit to the field windings 15 and 17. As the controller passes through the transition point $T_2$, the segment 76 engages the contact finger 62 and establishes energizing circuits for the switches 33 and 37, and it will be apparent that closure of the switch 33 is effective to connect the field winding 15 to one side of the field winding 16 through the conductors 108 and 109, and that closure of the switch 37 is effective to connect the field winding 17 to one side of the field winding 18 through the conductors 110 and 111. When the controller is in its sixth position, it will be seen that the segment 72 is disengaged from the contact finger 60 and accordingly the switches 38 and 40 are deenergized to complete the transition from parallel to series parallel. The field windings 15 and 16 are now connected in series relation with each other and in parallel circuit relation with the field windings 17 and 18 which are themselves connected in series circuit relation. The circuit for the field windings 15 and 16 may be traced from the field terminal 93 through the conductor 103, the switch 34, the conductor 104, the field winding 16, the conductor 109, the switch 33, the conductor 108, the field winding 15 and the conductors 100, 101 and 102 to the other terminal 96, while the circuit for the windings 17 and 18 may be traced from the terminal 93 through the conductors 105 and 107, the field winding 18, the conductor 111, the switch 37, the conductor 110, the field winding 17, the switch 39 and the conductor 102 to the other terminal 96.

It will also be observed that when the controller is in its sixth position, the segments 77, 78 and 79 respectively engage the controller fingers 56, 57 and 58 to establish energizing circuits for the switches 46, 47 and 44 whereby a shunt circuit is established which extends from the connection point 84 through the conductor 85, the switch 44, the conductor 86, the resistor 43, the switch 46 and the conductors 89, 90 and 91 to the other connection point 92. As the controller is now moved sequentially to its seventh, eighth and ninth positions, it will be apparent that the segments 77, 78 and 79 will be disengaged from the associated contact fingers to deenergize the switches 46, 47 and 44 in sequence and thereby gradually reduce the effect of the shunt circuit so that in the ninth position, the total armature current will be flowing through the field windings which are now connected in series parallel circuit relation.

As hereinbefore mentioned, further acceleration of the locomotive may now be accomplished by transferring the field windings from series parallel to full series relation, and this is accomplished by moving the controller from its ninth to its tenth position through the transition points $T_3$ and $T_4$. As the controller passes through the transition point $T_3$, the segment 74 will be disengaged from the contact finger 64 and accordingly, the switch 34 will be deenergized, thereby disconnecting the circuit to the field windings 15 and 16. As the controller passes through the transition point $T_4$, the segment 80 will engage the contact fingers 63 and establish an energizing circuit for the switch 35, thereby connecting the open side of the field winding 16 to one side of the field winding 17 through the conductors 112 and 113. The transition to full series connection of the field windings is completed when the controller reaches its tenth position by the disengagement of the segment 73 from the contact finger 61 and the consequent deenergization of the switch 39, the circuit for the field windings now extending from the field terminal 93 through the conductors 105 and 107, the field winding 18, the conductor 111, the switch 37 the conductor 110, the field winding 17, the conductor 113, the switch 35, the conductor 112, the field winding 16, the conductor 109, the switch 33, the conductor 108, the field winding 15 and the conductors 100, 101 and 102 to the other field terminal 96.

Simultaneously with the establishment of the series field connection, the controller segments 81, 82 and 83 engage the contact fingers 56, 57 and 58 respectively and thereby again establish a shunt circuit for the field windings. This shunt circuit is the same as the shunt circuit which existed in the sixth position of the controller and accordingly, will not be again traced. As the controller is moved sequentially through its eleventh, twelfth and thirteenth positions, the segments 81, 82 and 83 will be disengaged from the associated contact fingers to vary the effect of the shunt circuit as described in connection with the series parallel operation, and when the controller is in its thirteenth position, the vehicle will be operating at its maximum speed, with the total generator current flowing through the field windings 15, 16, 17 and 18 in series.

The complete operation of the vehicle in a forward direction during both motoring and braking operation having now been described, it will be understood that the vehicle may be operated in an identical manner in a reverse direction simply by operating the reversing switches 27 to 31 inclusive to reverse the field connections of the generator and the motors. When the reversing switches are in the position indicated by the legend PR, it will be seen that the generator field will be connected in the same direction as for motoring operation in a forward direction, while the motor fields will be connected in a reverse direction and accordingly, when the controller 48 is operated as described above, the vehicle will be accelerated in a reverse direction. In order to provide regenerative braking in the reverse direction, the reversing switches 27 to 31 inclusive may be operated to the position indicated by the legend BR, in which position the connections of the generator field will be reversed, while the motor fields will be connected in the same direction as for power operation in a forward direction.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

What I claim as new and desire to secure by Letters Patent of the United States is:

1. A control system for an electric vehicle comprising a plurality of traction motors having series-connected field windings, a source of energy, a motor-generator set having the motor thereof connected to said source of energy to drive the generator, said generator comprising field and armature windings connected in series circuit relation with each other and with said traction motors for supplying direct-current energy to said motors, means for reversing the connections of said generator field winding and said motor field windings to provide regenerative braking, means for varying the series field excitation of said generator to control the speed of said motors during motoring operation and during braking operation and means including a separately excited auxiliary field winding for said generator for controlling the polarity of said motors and said generator upon the transition from motoring operation to braking operation.

2. A control system for an electric vehicle comprising a plurality of traction motors having series-connected field windings, a source of energy, a motor-generator set having the motor thereof connected to said source to drive said generator, said generator comprising an armature and a plurality of main field windings connected in series circuit relation therewith, means for connecting each of said traction motors in series circuit relation with said generator, means for reversing the field connections of said generator and of said traction motors to provide regenerative braking, means including a separately excited auxiliary field winding for said generator for controlling the polarity of said motors and said generator upon the transition from motoring operation to braking operation and means for selectively varying the circuit connections of said plurality of generator main field windings with respect to each other while maintaining all of said windings in series with said armature to control the speed of said traction motors during motoring operation and during braking operation.

3. A control system for an electric vehicle comprising a source of energy, a motor-generator set having the motor thereof connected to said source to drive the generator, said generator comprising field and armature windings connected in series circuit relation, a plurality of traction motors provided with armature and field windings, means for connecting the armature of each traction motor in series circuit relation with the field winding of another of said traction motors and with said generator, switching means for reversing the connections of said generator field and said traction motor fields to provide regenerative braking operation, means for varying the series field excitation of said generator to control the speed of said traction motors during motoring operation and during braking operation, and means comprising a separately excited auxiliary field winding for said generator for controlling the polarity of said generator.

4. A control system for an electric vehicle comprising a plurality of series-excited dynamo-electric machines electrically connected in series circuit relation with each other, a source of energy, an electric motor connected for energization from said source and having a mechanical driving connection with one of said dynamo-electric machines, another of said dynamo-electric machines having a driving connection with an axle of said vehicle, means for selectively connecting the exciting fields of said dynamo-electric machines for motoring or for regenerative braking operation, means including a separately excited auxiliary field winding for said one of said dynamo-electric machines for controlling the polarity thereof upon the transition from motoring operation to braking operation, and means for controlling the series field excitation of at least one of said dynamo-electric machines to vary the speed of said vehicle during both motoring and braking operation.

5. A control system for an electric vehicle comprising a series-wound traction motor, a generator for supplying energy to said motor provided with an armature winding and a field winding connected in series circuit relation, means for driving said generator, a separately excited auxiliary field winding for said generator, a controller movable from an off position to a plurality of circuit controlling positions, means including circuit connections established by said controller in its first circuit controlling position for short-circuiting said generator series field winding whereby said generator is initially excited solely by said auxiliary field winding to cause the voltage supplied to said traction motor to build up slowly, and means including circuit connections sequentially established upon movement of said controller to others of said circuit controlling positions for controlling the excitation of said generator field winding to vary the voltage of said generator and thereby control the speed of said traction motor.

6. A control system for an electric vehicle comprising a traction motor, a motor-generator set for supplying energy to said motor, a source of energy, means for connecting the motor of said set to said source, said generator being provided with an armature and a plurality of main exciting field windings, a separately excited auxiliary field winding for said generator, a controller movable from an off position to a plurality of circuit controlling positions for connecting said generator in energizing relation with said traction motor, means including circuit connections established by said controller in its first circuit controlling position for short-circuiting said main exciting field windings whereby said generator is initially excited solely by said auxiliary field winding to cause the voltage supplied to said traction motor to build up slowly, and means including circuit connections sequentially established upon movement of said controller to others of said circuit controlling positions for selectively connecting said main field windings in parallel, in series parallel, or in series relation with each other while maintaining all of said windings in series circuit with said armature to vary the field excitation of said generator, and thereby control the voltage applied to said traction motor.

7. A control system for an electric vehicle comprising a source of energy, a motor-generator set having the motor thereof connected to said source to drive the generator, said generator comprising field and armature windings connected in series circuit relation, a plurality of traction motors respectively provided with field and armature windings, means for connecting the armature of each traction motor in series circuit relation with the field winding of another of said traction motors and with said generator, switching means for reversing the connections of said generator field and said traction motor fields to provide regenerative braking, and means for varying the series field excitation of said generator to control the speed of said traction motors during motoring operation and during braking operation, the cross-connection of said motor armatures and fields serving to maintain balanced the currents generated by said motors during regenerative braking operation.

8. A control system for an electric vehicle comprising a traction motor having a series field winding, a motor-generator set, the generator of said set comprising field and armature windings connected in series circuit relation, a source of energy, means for connecting the motor of said set to said source, a controller movable through a plurality of circuit controlling positions, said controller having an off position adjacent the first of said circuit controlling positions and a second off position adjacent the last of said circuit controlling positions, means including circuit connections sequentially established upon movement of said controller from said first off position for connecting said generator to said traction motor for motoring operation and for controlling said series connected generator field windings to vary the voltage applied to said traction motor and thereby accelerate said vehicle, means for reversing the field connections of said traction motor and said generator, and means including circuit connections established upon movement of said controller from said second off position for establishing regenerative braking operation by causing said traction motor to build up a voltage as a generator to energize said generator as a motor and cause said motor-generator set to return energy to said source and for controlling the field connections of said generator during said regenerative braking operation to vary the counter-electromotive force of said generator and thereby control the braking effort provided.

HAROLD S. OGDEN.